(12) United States Patent
Liaw

(10) Patent No.: US 6,961,293 B2
(45) Date of Patent: Nov. 1, 2005

(54) METHOD AND RELATED DEVICE FOR ACHIEVING STABLE WRITING STATE OF COMPACT DISK DRIVE BY ADJUSTING WRITING CLOCK

(75) Inventor: Chih-Yang Liaw, Taipei Hsien (TW)

(73) Assignee: VIA Technologies Inc., Hsin-Tien (TW)

( * ) Notice: Subject to any disclaimer, the term of this patent is extended or adjusted under 35 U.S.C. 154(b) by 213 days.

(21) Appl. No.: 10/249,084

(22) Filed: Mar. 14, 2003

(65) Prior Publication Data

US 2003/0185114 A1 Oct. 2, 2003

(30) Foreign Application Priority Data

Mar. 26, 2002 (TW) .......................................... 91105953 A

(51) Int. Cl.⁷ .............................................. G11B 7/00
(52) U.S. Cl. ................ 369/47.3; 369/47.48; 369/53.34; 369/47.28; 369/47.35
(58) Field of Search .......................... 369/47.48, 53.34, 369/47.28, 47.35, 47.47, 47.32, 53.36, 47.22, 47.39, 59.25; 358/1.5

(56) References Cited

U.S. PATENT DOCUMENTS

| | | | | |
|---|---|---|---|---|
| 5,163,035 A | * | 11/1992 | Horikiri | 369/47.39 |
| 6,081,490 A | | 6/2000 | Kuroda et al. | |
| 6,118,742 A | * | 9/2000 | Matsui et al. | 369/47.48 |
| 6,137,756 A | * | 10/2000 | Yoshida et al. | 369/53.36 |
| 6,201,784 B1 | * | 3/2001 | Maeda | 369/59.25 |
| 6,236,629 B1 | * | 5/2001 | Hisakado et al. | 369/47.32 |
| 6,310,843 B1 | * | 10/2001 | Kuroda et al. | 369/47.28 |
| 6,324,136 B1 | * | 11/2001 | Yoshida et al. | 369/47.22 |
| 6,385,151 B2 | * | 5/2002 | Kuroda et al. | 369/47.28 |
| 6,473,377 B2 | * | 10/2002 | Eguchi et al. | 369/47.47 |
| 6,522,608 B1 | * | 2/2003 | Kuroda | 369/47.28 |
| 6,538,965 B2 | * | 3/2003 | Mochizuki et al. | 369/47.22 |
| 6,700,847 B2 | * | 3/2004 | Osada | 369/53.34 |
| 2001/0024286 A1 | * | 9/2001 | Eom | 358/1.5 |
| 2003/0165095 A1 | * | 9/2003 | Iimura et al. | 369/47.22 |

* cited by examiner

Primary Examiner—W. R. Young
Assistant Examiner—Kyung D. Kim
(74) Attorney, Agent, or Firm—Winston Hsu

(57) ABSTRACT

A method and related circuit for synchronizing a writing clock with a wobble clock of a compact disk (CD) drive. The CD drive is capable of rotating a CD that has a data track for recording data and a wobble track. The CD drive is capable of generating the wobble clock according to movement of the wobble track while the CD is rotating. Also the CD drive is capable of writing data on the data track according to the writing clock. The method includes adjusting the frequency of the writing clock so as to synchronize the writing clock and the wobble clock.

19 Claims, 5 Drawing Sheets

US 6,961,293 B2

METHOD AND RELATED DEVICE FOR ACHIEVING STABLE WRITING STATE OF COMPACT DISK DRIVE BY ADJUSTING WRITING CLOCK

BACKGROUND OF INVENTION

1. Field of the Invention

The present invention relates to a method and related devices for synchronizing a wobble clock with a writing clock of a compact disk (CD) drive, and more particularly, to a method and related devices for synchronizing the wobble clock with the writing clock by adjusting the frequency of the writing clock.

2. Description of the Prior Art

In this modern information based society, one of the major concerns is how to manage and store tremendous amounts of information. Compared to other kinds of storage media, a compact disk has a small size and a higher-density storage capacity. Due to developments in recordable and rewritable compact disk technology, consumers have the ability to utilize compact disk storage capacity on their personal computers.

Similar to general compact disks, the recordable compact disk (CDR) also has a plurality of pits and lands arranged along a data track for recording digital data. Furthermore, the recordable compact disk comprises a wobble track positioned adjacent the data track for recording wobble signals, which are used for separating the recordable compact disk into a plurality of areas on the surface of the CD. Each of the areas is defined as a big frame or a mini-frame, and is separated into ninety-eight small subframes, in which each of the small subframes comprises 588 channel bits for recording digital data. Because there is no data stored in the data track of a blank recordable CD, the CD drive cannot distinguish the big frames from each other according to the data track before data are written on the data track. In order to orientate the big frames, the wobble track of the recordable CD records wobble signals. Please refer to FIG. 1 which is a top view of a recordable compact disk 10.

As shown in FIG. 1, the compact disk 10 comprises a reflecting surface 13. On the reflecting surface 13 of the compact disk 10, there is a fine spiral track 11. Please refer to FIG. 1, which shows a magnified view 1A of the fine track 11. The track 11 is composed of two types of tracks, one being a data track 12 to record data, and the other being a wobble track 14 positioned adjacent to the data track 12. As illustrated in the magnified view 1A, the data track 12 has a continuously spiral shape, while the wobble track 14 has an oscillating shape. Additionally, the curvature of the wobble track 14 is composed of small segment curves. In a further magnified view 1B in FIG. 1, an interrupt and discontinuity record mark 16 is shown within data track 12. The length of each record mark 16 varies, and the reflection index of the record mark 16 is different from that of the reflecting surface 13. The record mark 16 is used to allow the compact disk drive to be able to write data on the compact disk 10. The surface of the wobble track 14 protrudes beyond the reflecting surface 13, and the reflection index of the wobble track 14 is also different from that of the reflecting surface 13. The data track 12 is located inside a groove formed by the raised wobble track 14 surface as shown in FIG. 2, which is a three-dimensional perspective view of the magnified view 1B of the compact disk 10. As the compact disk 10 rotates, the compact disk drive detects the variation of the reflection light from the small segment curves of the wobble track 14 so as to generate a wobble signal. The wobble signal is a frequency-modulated signal and represents different digital data through varied frequencies. The compact disk drive generates a harmony signal, which is used for orientating the big frames of the data track 12, by decoding the wobble signal.

In other words, when the compact disk drive writes data on to the recordable compact disk 10, the CD drive analyzes the distribution of the big frames of the data track 12 by decoding the wobble signal read from the wobble track 14. Because the CD drive writes data on to the data track 12 while the compact disk rotates, the operations of writing must be synchronized with the rotation of the compact disk. The CD drive, thus, can write the digital data on the correct locations of the data track 12. Please refer to FIG. 3. FIG. 3 is a timing diagram of waveforms of related signals of a CD drive. When digital data is written on the recordable compact disk 10, the CD drive controls the length of each channel bit according to a writing clock Cw. The length of each period of the writing clock Cw determines the length of corresponding record marks 16. As previously mentioned, each big frame of the data track 12 is composed of a plurality of channel bits. Therefore, a frame clock Cf, which corresponds to the big frames, can be generated according to the writing clock Cw. One period of the frame clock Cf is defined as the time duration Tfw in which the CD drive writes data on to a corresponding big frame. The waveforms of the writing clock Cw and the frame clock Cf are shown in FIG. 3. Additionally, the CD drive also can decode the wobble clock Cb1 and the harmony signal S1 while the CD is rotating over an optical module of the CD drive. Generally, the harmony signal S1, which corresponds to the rotation speed of the CD, should be synchronized with the frame clock Cf that is used to control the operations of the optical module while the CD is being written, as shown in FIG. 3. In other words, if the optical module operates correctly, the harmony signal S1, which has periods Tf for locating the positions of big frames of the CD, must have the same period and frequency as the frame clock Cf, which has periods Tfw, and synchronizes with the writing clock Cw. Moreover, the phase difference between the harmony signal S1 and the frame clock Cf is equal to zero or is less than a predetermined error range. Therefore, the CD drive is capable of writing data on correct positions according to the harmony signal S1, which is associated with the wobble track 14.

However, if the rotation speed of the CD is too fast, the wobble track 14 and the data track 12 rotate over the optical module faster, and this makes the periods of the harmony signal shorten. As shown in FIG. 3, another set of wobble signal Cb2 and harmony signal S2 correspond to such a condition. Because the frame clock Cf does not synchronize with the harmony signal S2, the CD drive may write data on wrong big frames of the CD. Similarly, another set of wobble signal Cb3 and harmony signal S3, shown in FIG. 3, correspond to a condition in which the rotation speed of the CD is too slow. The CD drive also writes data on wrong big frames of the CD according to the frame clock Cf, which does not synchronize with the harmony signal S3.

Each of CD drives must have a control circuit for synchronizing the frame clock with the harmony signal. Please refer to FIG. 4, which is a function block diagram of a CD drive 20 having a control circuit 22 according to the prior art. The CD drive 20 is used to write data on the CD 10, and comprises the control circuit 22, a motor 34, and an optical module 32. The motor 34 rotates the CD 10. The optical module 32 generates corresponding time-variable signals by detecting the data track 12 and the wobble track 14 while the CD 10 is rotating, and generates a corresponding harmony signal S0 according to the corresponding time-variable signals. Moreover, the optical module 32 can also write data on the data track 12 according to a writing clock Cw0. The control circuit 22 has a synchronization circuit FC, a frequency divider 24, a phase detector PD0, a frequency detector FD0, a sub-control circuit 28, a switch circuit 30, and an activating circuit 26. The synchronization circuit FC can generate the writing clock Cw0 according to a system clock Cs0 that has fixed time periods, and further comprises a frequency divider and a phase-locking circuit that are used to synchronize the writing clock Cw0 with the system clock Cs0, where the ratio between the periods of the writing clock Cw0 with the system clock Cs0 is equal to a constant. Because the system clock Cs0 has a plurality of periods with the same interval, the periods of the writing clock Cw0 also correspond to the same time duration. The writing clock Cw0 is divided by a predetermined ratio D0 via the frequency divider 24 so as to generate a frame clock Cf0. That means that the period of the frame clock Cf0 is D0 times of the period of the writing clock Cw0. As previously mentioned, there are a plurality of channel bits in a big frame, and one of the periods of the frame clock Cf0 corresponds to an equivalent number of the periods of the writing clock Cw0, so that the ratio D0 can be determined. The phase detector PD0 and the frequency detector FD0 respectively detect the phase difference and the frequency difference between the frame clock Cf0 and the harmony signal S0, and the outputs of the phase detector PD0 and the frequency detector FD0 transmit to activating circuit 26 and the sub-control circuit 28. The sub-control circuit 28 has a low-pass frequency filter to filter the signal received from the phase detector PD0 and the frequency detector FD0. The switch circuit 30 is turned on/off by an input signal Mode so as to determine whether to transmit the output signal of the sub-control circuit 28 to the activating circuit 26. The activating circuit 26 can transmit a corresponding activating signal M0 to the motor 34 according to the inputs received from the phase detector PD0, the frequency detector FD0, and the sub-control circuit 28 so as to control the rotation speed of the CD 10.

The control circuit 22 is used to synchronize the harmony signal S0 with the frame clock Cf0 so as to make the optical module 32 write data on the correct position of the CD 10. According to the prior art, the frame clock Cf0 is generated according to the system clock Cs0, which has periods with the same interval, so the time duration of each period of the frame clock Cf0 is fixed and the frame clock Cf0 can be taken as a standard clock signal. Additionally, the harmony signal S0 generated by the optical module 32 can respond to the rotation speed of the CD 10. The frame clock Cf0 and the harmony signal S0 are transmitted to the phase detector PD0 and the frequency detector FD0 to compare their phases and frequencies respectively, and the results of the phase detector PD0 and the frequency detector FD0 transmit to the activating circuit 26 so that the activating circuit 26 can control the rotation speed of the motor 34 according to the received results. For example, if the motor 34 rotates too fast, the frequency of the harmony signal S0 increases, and then the phase detector PD0 and the frequency detector FD0 compare the harmony signal S0 with the frame clock Cf0 and generate corresponding signal and transmit it to the activating circuit 26 to reduce the rotation speed of the motor 34. In other words, the method according to the prior art adjusts the phase and the frequency of the harmony signal S0 so as to synchronize the harmony signal S0 with the frame clock Cf0, which has fixed frequency.

To write data on the correct position on the CD 10, the control circuit 22 should eventually make the phase difference and the frequency difference between the frame clock Cf0 and the harmony signal S0 equal to zero. However, the motor 34 cannot be driven, if there is not any signal with a nonzero voltage (or current) transmitted to the motor 34. When there is not any phase difference or frequency difference between the frame clock Cf0 and the harmony signal S0, the phase detector PD0 and the frequency detector FD0 do not transmit any signal to the activating circuit 26. To avoid shutting down the motor 34 when the CD drive 20 writes data on the CD 10 and the phase difference and the frequency difference between the frame clock Cf0 and the harmony signal S0 are equal to zero, a sub-control circuit 28 is needed to transmit signals to the activating circuit 26 in a timely manner. Therefore, the method according to the prior art comprises the two following steps: (1) adjusting the rotation speed of the motor 34 to make the frequency difference between the frame clock Cf0 and the harmony signal S0 be equal to zero, and to make the phase difference between the frame clock Cf0 and the harmony signal S0 be unequal to zero, where the phase difference can trigger the activating circuit 26 to transmit the activating signal M0 to the motor 34 to force the motor 34 rotate (i.e. the CD drive 20 is in a constant linear velocity mode and the switch circuit 30 disconnects the output of the sub control circuit 28 from the activating circuit 26 at this time); and (2) after there is a stable phase difference between the frame clock Cf0 and the harmony signal S0, switching the CD drive 20 into a write mode, and then the control circuit 22 further makes the phase difference between the frame clock Cf0 and the harmony signal S0 equal to zero, and meanwhile a mode control signal terminal Mode controls the switch circuit 30 to connect the output of the sub-control circuit 28 with the activating circuit 26 so as to force the motor 34 to rotate constantly. In other words, the sub-control circuit 28 records the phase difference when the CD drive 20 is in the constant linear velocity mode so as to drive the motor 34 when the CD drive 20 switches to the write mode.

Because the method according to the prior art controls the rotation speed of the motor 34 to adjust the harmony signal S0 so as to synchronize the harmony signal S0 with the frame clock Cf0, and the CD drive 20 must mechanically switch from the constant linear velocity mode to the write mode to drive the motor 34, a long response time is required for the CD drive 20 to write data onto the CD 10. Furthermore, other embedded circuitry of the CD drive 20 is necessary to control the timing to switch the CD drive 20 from the constant linear velocity mode to the write mode, that makes the circuit design of the CD drive 20 more complex.

SUMMARY OF INVENTION

It is therefore a primary object of the present invention to provide a method and related devices for synchronizing the wobble clock with the writing clock by adjusting the frequency of the writing clock so as to achieving a stable writing state of a compact disk drive quickly.

Briefly, the invention provides a method for adjusting signals of a compact disk (CD) drive and synchronizing a wobble clock with a writing clock. The CD drive has a motor for forcing a CD to rotate. The CD has a data track for storing data and a wobble track for recording signals. When the motor forces the CD to rotate, the CD drive generates the wobble clock according to the wobble track, and the CD drive is capable of writing data on the data track according to the writing clock. The method includes adjusting a frequency of the writing clock or a phase of the writing clock to synchronize the writing clock with the wobble clock.

These and other objects of the invention will no doubt become obvious to those ordinary skill in the art after reading the following detailed description of the preferred embodiment which is illustrated in the various figures and drawings.

DETAILED DESCRIPTION

Figure 1:
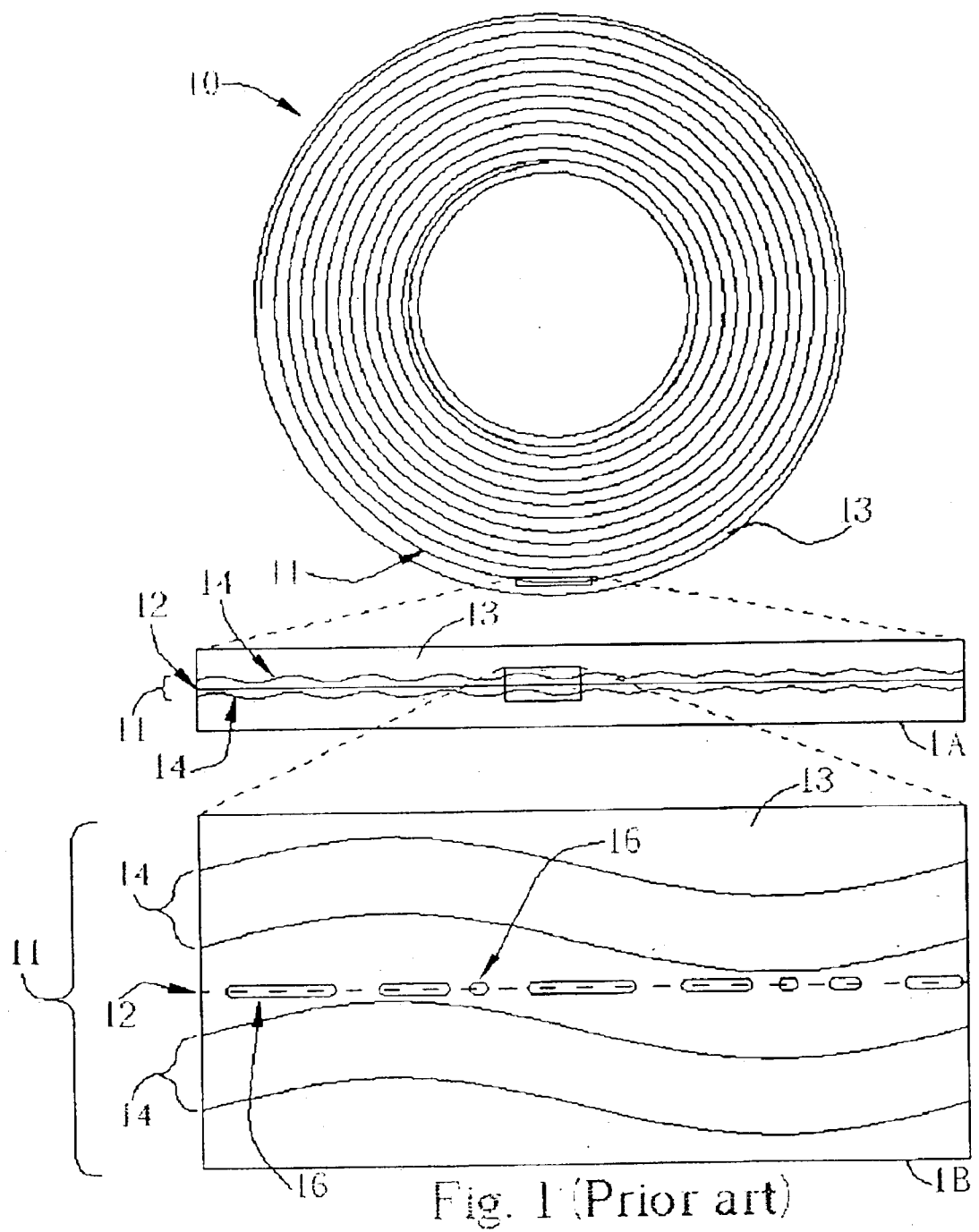
FIG. 1 is a top view of a recordable compact disk.
Figure 2:
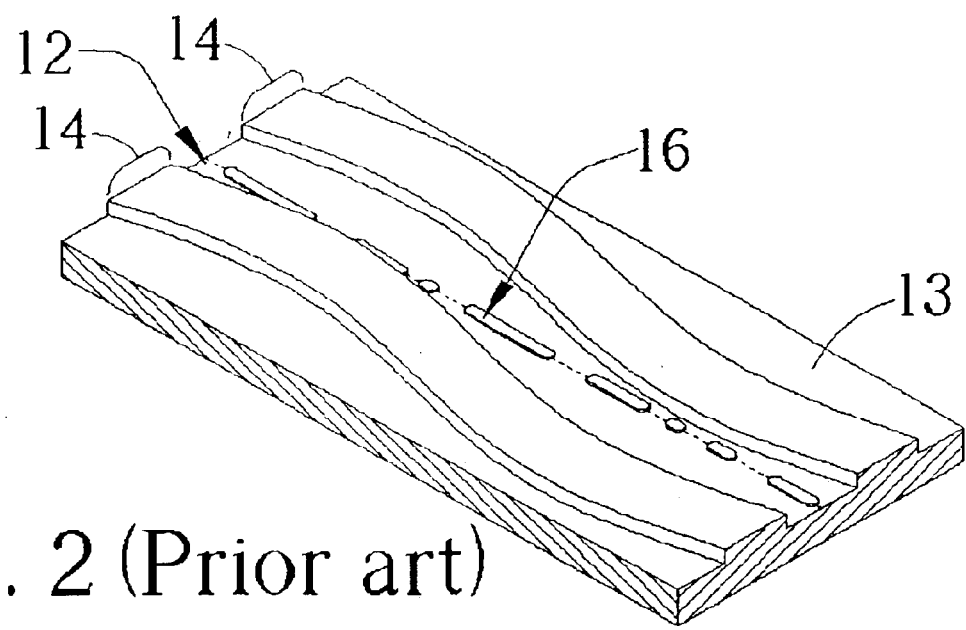
FIG. 2 is a three-dimensional perspective view of the magnified view 1B of the compact disk.
Figure 3:
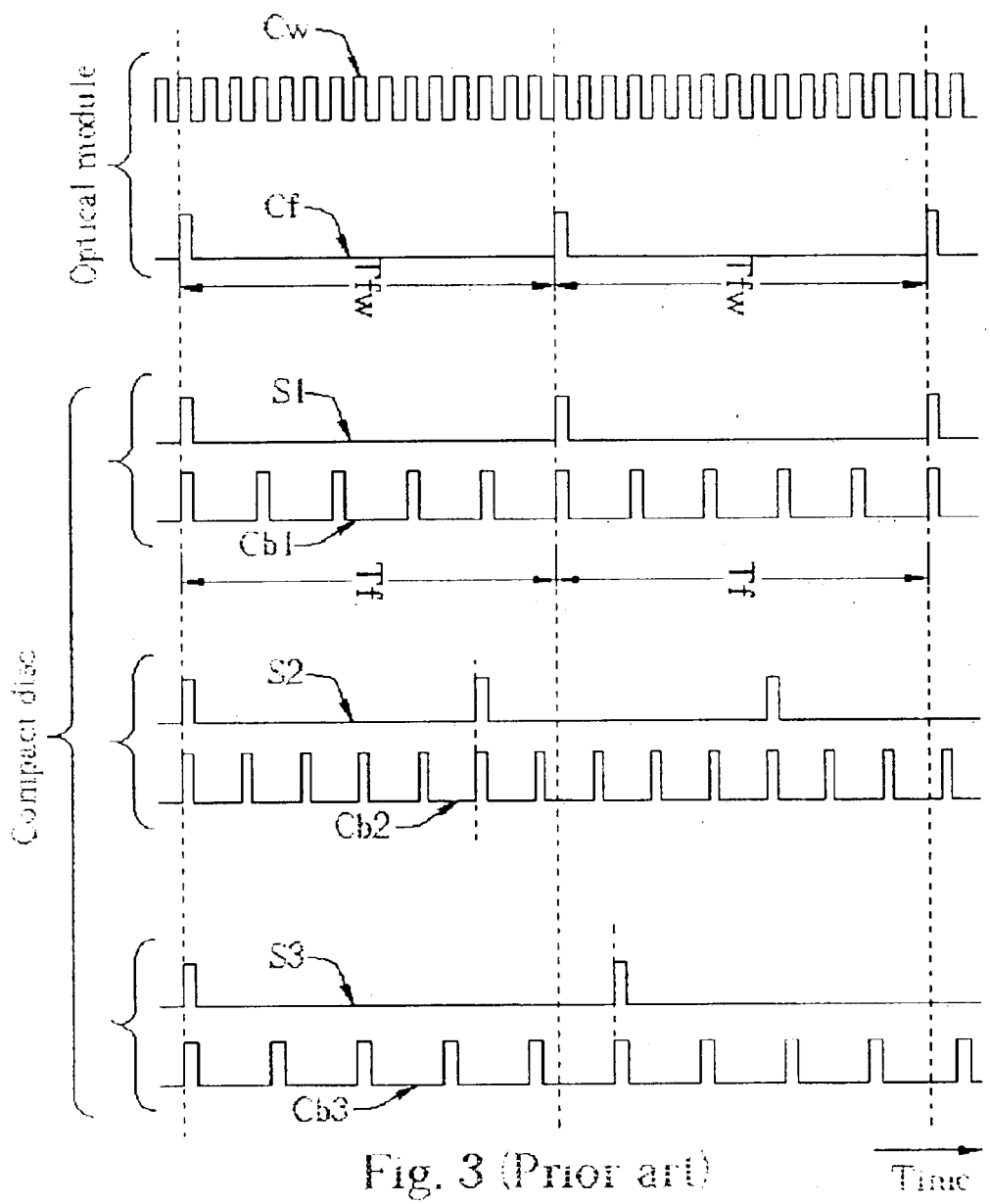
FIG. 3 is a timing diagram of waveforms of related signals of a compact disk drive.
Figure 4:
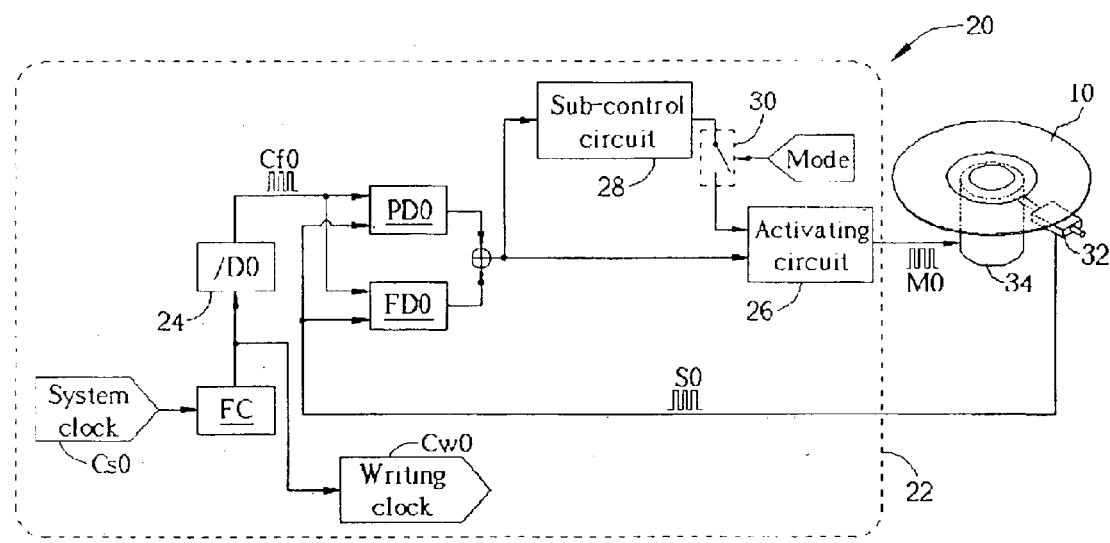
FIG. 4 is a function block diagram of a compact disk drive according to the prior art.
Figure 5:
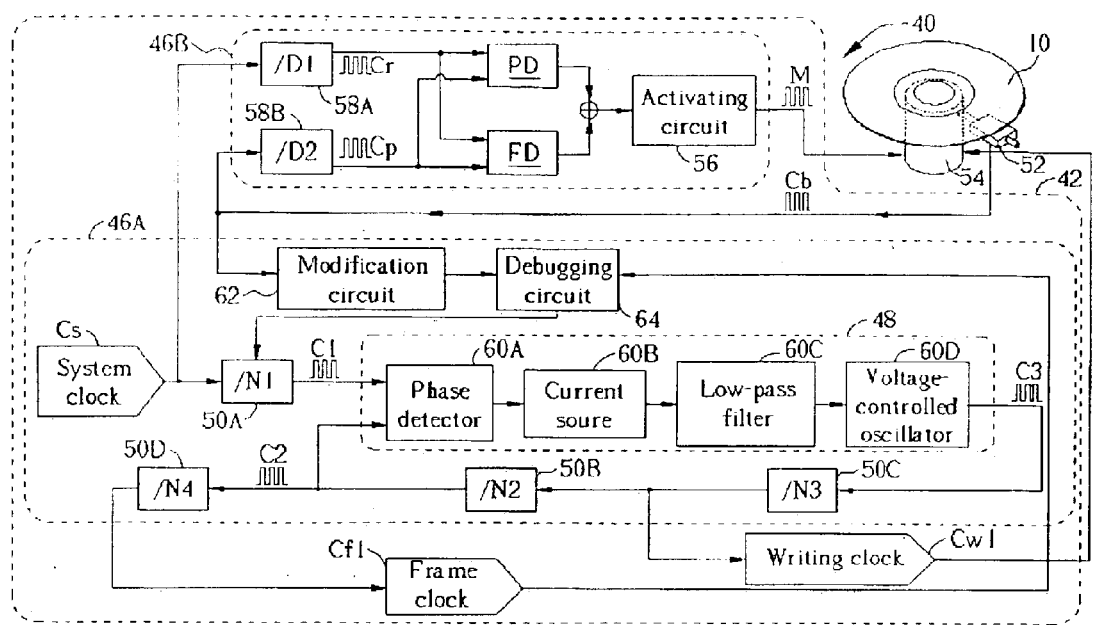
FIG. 5 is a function block diagram of a compact disk drive according to the present invention.

Please refer to FIG. 5, which is a function block diagram of a compact disk (CD) drive 40 according to the present invention. The CD drive 40 comprises a control circuit 42, a motor 54, and an optical module 52. The motor 54 is used for forcing the CD 10 to rotate. When the CD 10 rotates over the optical module 52, the optical module 52 generates a corresponding wobble clock Cb. Additionally, the optical module 52 can write data on the data track 12 according to a writing clock Cw1. The control circuit 42 is used for generating the writing clock Cw1 and a frame clock Cf1, which synchronizes with the writing clock Cw1, and for making the frame clock Cf1 synchronize with a harmony signal, which is relatively generated with the wobble clock Cb.

The control circuit 42 has a clock generator 46A and a stabilizing circuit 46B. The clock generator 46A comprises a first frequency divider 50A, a second frequency divider 50B, a third frequency divider 50C, a fourth frequency divider 50D, a phase-locking circuit 48, a modification circuit 62, and a debugging circuit 64. The four frequency dividers 50A–50D are used to divide frequencies of signals by a first ratio N1, a second ratio N2, a third ratio N3, and a fourth ratio N4 respectively. The phase-locking circuit 48 comprises a phase detector 60A, a current source 60B, a low-pass filter 60C, and voltage-controlled oscillator 60D. The phase detector 60A is capable of detecting a phase difference between two input signals. The current source 60B is capable of generating current, and the magnitude of the current is determined by the phase difference detected by the phase detector 60A, so that the low-pass filter 60C can output a corresponding voltage. Finally, the voltage-controlled oscillator 60D can generate a clock signal, in which the duration of each period corresponds to the voltage received from the low-pass filter 60C. The stabilizing circuit 46B comprises two frequency dividers 58A, 58B, a phase detector PD, a frequency detector FD, and an activating circuit 56.

The clock generator 46A of the control circuit 42 receives a system clock Cs that has a plurality of periods with a same interval. The first frequency divider 50A divides the system clock Cs by the first ratio N1 to generate a first clock C1. The phase-locking circuit 48 generates a third clock C3. The third frequency divider 50C divides the third clock C3 by the third ratio N3 to generate the writing clock Cw1. The second frequency divider 50B divides the writing clock Cw1 by the second ratio N2 to generate a second clock C2. The first clock C1 and the second clock C2 are fed back to the phase-locking circuit 48 so that the phase-locking circuit 48 can synchronize the first clock C1 with the second clock C2. Additionally, the fourth frequency divider 50D is used to divide the second clock C2 by the fourth ratio N4 to generate the frame clock Cf1. The time duration of one period of the system clock Cs, the first clock C1, the second clock C2, and the writing clock Cw1 will later be respectively represented by Ts, T1, T2, and Tw1. Because the phase-locking circuit 48 locks the phases both of the first clock C1 and the second clock C2 to synchronize the first clock C1 with the second clock C2, T1 is equal to T2. As previously mentioned, the first frequency divider 50A generates the first clock C1 and the second frequency divider 50B to generate the second clock C2, so N2×Tw1=T2 and N1×Ts=T1, and then the equation Tw1=(N1/N2)×Ts is obtained. In other words, the period of the writing clock Tw1 is directly proportional to the period of the system clock Ts, and the ratio of the period of the writing clock Tw1 to the period of the system clock Ts is defined as a phase-locked rate (i.e. N1/N2). Because the period of the system clock Ts is fixed, the period of the writing clock Tw1 can be easily adjusted by changing the phase-locked rate. Additionally, the frame clock Cf1 is generated by dividing the writing clock Cw1 via the second frequency divider 50B and the fourth frequency divider 50D.

The modification circuit 62 of the clock generator 46A can repair the waveform of the wobble clock Cb received from the optical module 52 by filtering noise. The debugging circuit 64 is used for generating a harmony signal, which synchronizes with the wobble clock Cb that is repaired by the modification circuit 62, according to the wobble clock Cb, and adjusting the first dividing ratio N1 according to the frequency of the wobble clock Cb and the phase difference between the harmony signal and the frame clock Cf1. In the stabilizing circuit 46B, a reference clock Cr is generated by dividing the system clock Cs via the frequency divider 58A, and a compared clock Cp is generated by dividing the wobble clock Cb via the frequency divider 58B. The phase detector PD and the frequency detector FS respectively detect the phase difference and the frequency difference between the reference clock Cr and the compared clock Cp, and then output the results to the activating circuit 56 so that the activating circuit 56 can control the rotation speed of the motor 54 via an activating signal terminal M of the activating circuit 56.

The major feature of the present invention is to adjust the frequency of the writing clock Cw1 for synchronizing and locking the frame clock Cf1 with the harmony signal, which is generated by the optical module 52, so as to write data on the correct position of the data track 12. The frequency divider 58A of the stabilizing circuit 46B divides the system clock Cs by a ratio D1 to generate the reference clock Cr, which is taken as a standard clock signal, so that the compared clock Cp, which synchronizes with the wobble clock Cb, is capable of archiving a steady state gradually according to the reference clock Cr. That means that the motor 54 is controlled to operate with a stable rotation speed. In order to make the rotation speed of the motor 54 stable, it just needs to make the phase difference between the reference clock Cr and the compared clock Cp stable without completely phase-locking the reference clock Cr with the compared clock Cp. In other words, the stabilizing circuit 46B is capable of controlling the rotation speed of the motor 54 to maintain in a relatively steady state according to the system clock Cs as long as the phase difference between the reference clock Cr and the compared clock Cp is stable.

When the motor operates stably, the periods of both the wobble clock Cb and the harmony signal become unchanged. The frequencies and the phases of both the writing clock Cw1 and the frame clock Cf1 can be changed according to the wobble Cb and the harmony signal so that the frame clock Cf1 can be locked with the harmony signal. The debugging circuit 64 generates the corresponding harmony signal according to the wobble clock Cb, and obtains the phase difference between the harmony signal and the frame clock Cf1. In other words, the debugging circuit 64 changes the first ratio N1 of the first frequency divider 50A according to the frequency of the wobble clock Cb and the phase difference between the harmony signal and the frame clock Cf1 to synchronize the wobble clock Cb with the writing clock Cw1. As previously mentioned, Tw1=(N1/N2)×Ts and the frequency of the writing clock Cw1 is (N2×N4) times the frequency of the frame clock Cf1. In the condition that the period of the system clock Ts is fixed, the period of the writing clock Tw1 and the frequency of the frame clock Cf1 can be controlled by changing the first ratio N1. After the writing clock Cw1 is divided by the two frequency dividers 50B, and 50D to generate the frame clock Cf1, the frame clock Cf1 is fed back to the debugging circuit 64 so as to adjust both the frequency and the period of the writing clock Cw1 and the frame clock Cf1. Finally, the frame clock Cf1 and the harmony signal of the debugging circuit 64 are phase locked without any phase difference. For example, when the rotation speed of the motor 54 is too high and causes the frequency of the wobble clock Cb to increase, the debugging circuit 64 detects this situation and then reduces the first ratio N1 so that the frequencies both of the writing clock Cw1 and the frame clock Cf1 increase, and so that the frequency difference between the writing clock Cw1 and the wobble clock Cb decreases. Similarly, if the frequency of the frame clock Cf1 is less than the harmony signal, the debugging circuit 64 decreases the first ratio so that the frequency of the writing clock Cf1 increases and that the frequency difference between the frame clock Cf1 and the harmony signal reduces.

In contrast to the prior art, the present invention method locks the frame clock with the harmony signal by adjusting the frequencies of both the writing clock and the frame clock in the condition that the motor rotates stably. Because the writing clock and the frame clock are generated electrically, there is a shorter response time for controlling operations of the motor compared to the prior art. Moreover, the wobble clock and the writing clock can be phase-locked without changing the rotation speed of the motor, so it becomes simpler to control the operations of the motor. Furthermore, because it is unnecessary to switch the CD drive from the constant linear velocity mode to the write mode, circuit design become easier and reduces the cost of the CD drive.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for adjusting signals of a compact disk (CD) drive and synchronizing a wobble clock with a writing clock, the method comprising:

using a motor of the CD drive to force a CD to rotate, the CD having a data track for storing data and a wobble track for recording signals, wherein when the motor forces the CD to rotate, the CD drive generates the wobble clock according to the wobble track, and the CD drive is capable of writing data on the data track according to the writing clock;

adjusting a frequency of the writing clock to synchronize the writing clock with the wobble clock;

generating a system clock having a plurality of periods with a same interval;

generating the writing clock according to the system clock, a ratio of a period of the writing clock to a period of the system clock being equal to a phase-locked rate, wherein the frequency of the writing clock is adjusted by adjusting the phase-locked rate;

generating a frame clock, which synchronizes with the writing clock; and generating a harmony signal, which synchronizes with the wobble clock;

wherein the phase-locked rate is adjusted according to a phase difference between the frame clock and the harmony signal.

2. The method of claim 1 wherein the phase-locked rate is adjusted according to a frequency of the wobble clock.

3. The method of claim 1 further comprising:

generating a reference clock, which synchronizes with the system clock; and adjusting a rotation rate of the motor for forcing the CD to rotate according to a frequency difference between the reference clock and the wobble clock.

4. The method of claim 1 further comprising:

dividing the system clock by a first dividing ratio to generate a first clock;

dividing the writing clock by a second dividing ratio to generate a second clock; and generating a third clock according to a phase difference between the first clock and the second clock;

wherein the writing clock is generated by dividing the third clock by a third dividing ratio.

5. The method of claim 4 further comprising:

dividing the second clock by a fourth dividing ratio to generate a frame clock; and generating a harmony signal, which synchronizes with the wobble clock;

wherein the first dividing ratio is adjusted according to a phase difference between the frame clock and the harmony signal.

6. A method for adjusting signals of a compact disk (CD) drive and synchronizing a wobble clock with a writing clock, the method comprising:

using a motor of the CD drive to force a CD to rotate, the CD having a data track for storing data and a wobble track for recording signals, wherein when the motor forces the CD to rotate, the CD drive generates the wobble clock according to the wobble track, and the CD drive is capable of writing data on the data track according to the writing clock;

adjusting a phase of the writing clock to synchronize the writing clock with the wobble clock;

generating a system clock having a plurality of periods with a same interval;

generating the writing clock according to the system clock, a ratio of a period of the writing clock to a period of the system clock being equal to a phase-locked rate, wherein a frequency of the writing clock is adjusted by adjusting the phase-locked rate;

generating a frame clock, which synchronizes with the writing clock; and generating a harmony signal, which synchronizes with the wobble clock;

wherein the phase-locked rate is adjusted according to a phase difference between the frame clock and the harmony signal.

7. The method of claim 6 further comprising:
generating a reference clock, which synchronizes with the system clock; and
adjusting a rotation rate of the motor for forcing the CD to rotate according to a phase difference between the reference clock and the wobble clock.

8. The method of claim 6 further comprising:
dividing the system clock by a first dividing ratio to generate a first clock;
dividing the writing clock by a second dividing ratio to generate a second clock; and
generating a third clock according to a phase difference between the first clock and the second clock;
wherein the writing clock is generated by dividing the third clock by a third dividing ratio.

9. The method of claim 8 further comprising:
dividing the second clock by a fourth dividing ratio to generate a frame clock; and
generating a harmony signal, which synchronizes with the wobble clock;
wherein the first dividing ratio is adjusted according to a phase difference between the frame clock and the harmony signal.

10. A control circuit of a compact disk (CD) drive for synchronizing a wobble clock with a writing clock, the CD drive comprising:
a motor for forcing a CD to rotate, wherein the CD comprises:
a data track for storing data; and
a wobble track for recording signals;
wherein when the motor forces the CD to rotate, the CD drive generates the wobble clock according to the wobble track, and the CD drive is capable of writing data on the data track according to the writing clock;
the control circuit comprising:
a clock generator for adjusting a frequency of the writing clock to synchronize the writing clock with the wobble clock, the clock generator comprising;
a first frequency divider for dividing a system clock having a plurality of periods with a same interval by a first dividing ratio to generate a first clock;
a second frequency divider for dividing the writing clock by a second dividing ratio to generate a second clock;
a phase-locked circuit for generating a third clock according to a phase difference between the first clock and the second clock; and
a third frequency divider for dividing the third clock to generate the writing clock.

11. The control circuit of claim 10 further comprising a stabilizer circuit for adjusting a rotation rate of the motor for forcing the CD to rotate according to a frequency difference between the wobble clock and a reference clock having a plurality of periods with a same interval.

12. The control circuit of claim 10 wherein the clock generator further comprises:
a fourth frequency divider for dividing the second clock by a fourth dividing ratio to generate a frame clock; and
a debugging circuit for generating a harmony signal, which synchronizes with the wobble clock, and adjusting the first dividing ratio according to a phase difference between the harmony signal and the frame clock so that the clock generator is capable of adjusting the frequency of the writing clock.

13. The control circuit of claim 12 wherein the debugging circuit is capable of adjusting the first dividing ratio according to a frequency of the wobble clock.

14. A control circuit of a compact disk (CD) drive for synchronizing a wobble clock with a writing clock, the CD drive comprising:
a motor for forcing a CD to rotate, wherein the CD comprises:
a data track for storing data; and
a wobble track for recording signals;
wherein when the motor forces the CD to rotate, the CD drive generates the wobble clock according to the wobble track, and the CD drive is capable of writing data on the data track according to the writing clock;
the control circuit comprising:
a clock generator for adjusting a phase of the writing clock to synchronize the writing clock with the wobble clock, the clock generator comprising:
a first frequency divider for dividing a system clock having a plurality of periods with a same interval by a first dividing ratio to generate a first clock;
a second frequency divider for dividing the writing clock by a second dividing ratio to generate a second clock;
a phase-locked circuit for generating a third clock according to a phase difference between the first clock and the second clock; and
a third frequency divider for dividing the third clock to generate the writing clock.

15. The control circuit of claim 14 further comprising a stabilizer circuit for adjusting a rotation rate of the motor for forcing the CD to rotate according to a phase difference between the wobble clock and a reference clock having a plurality of periods with a same interval.

16. The control circuit of claim 14 wherein the clock generator further comprises:
a fourth frequency divider for dividing the second clock by a fourth dividing ratio to generate a frame clock; and
a debugging circuit for generating a harmony signal, which synchronizes with the wobble clock, and adjusting the first dividing ratio according to a phase difference between the harmony signal and the frame clock so that the clock generator is capable of adjusting the frequency of the writing clock.

17. The control circuit of claim 16 wherein the debugging circuit is capable of adjusting the first dividing ratio according to a frequency of the wobble clock.

18. A method for adjusting signals of a compact disk (CD) drive and synchronizing a wobble clock with a writing clock, the method comprising:
using a motor of the CD drive to force a CD to rotate, the CD having a data track for storing data and a wobble track for recording signals, wherein when the motor forces the CD to rotate, the CD drive generates the wobble clock according to the wobble track, and the CD drive is capable of writing data on the data back according to the writing clock;
adjusting a frequency of the writing clock to synchronize the writing clock with the wobble clock;
generating a system clock having a plurality of periods with a same interval;
generating the writing clock according to the system clock, a ratio of a period of the writing clock to a period of the system clock being equal to a phase-locked rate, wherein the frequency of the writing clock is adjusted by adjusting the phase-locked rate;

dividing the system clock by a first dividing ratio to generate a first clock;

dividing the writing clock by a second dividing ratio to generate a second clock; and generating a third clock according to a phase difference between the first clock and the second clock;

wherein the writing clock is generated by dividing the third clock by a third dividing ratio.

19. A method for adjusting signals of a compact disk (CD) drive and synchronizing a wobble clock with a writing clock, the method comprising:

using a motor of the CD drive to force a CD to rotate, the CD having a data track for storing data and a wobble track for recording signals, wherein when the motor forces the CD to rotate, the CD drive generates the wobble clock according to the wobble track, and the CD drive is capable of writing data on the data back according to the writing clock;

adjusting a phase of the writing clock to synchronize the writing clock with the wobble clock;

generating a system clock having a plurality of periods with a same interval;

generating the writing clock according to the system clock, a ratio of a period of the writing clock to a period of the system clock being equal to a phase-locked rate, wherein the frequency of the writing clock is adjusted by adjusting the phase-locked rate;

dividing the system clock by a first dividing ratio to generate a first clock;

dividing the writing clock by a second dividing ratio to generate a second clock; and generating a third clock according to a phase difference between the first clock and the second clock;

wherein the writing clock is generated by dividing the third clock by a third dividing ratio.

* * * * *